United States Patent
Chan et al.

(10) Patent No.: US 7,673,201 B1
(45) Date of Patent: Mar. 2, 2010

(54) RECOVERING A PRIOR STATE OF A CIRCUIT DESIGN WITHIN A PROGRAMMABLE INTEGRATED CIRCUIT

(75) Inventors: Chi Bun Chan, San Jose, CA (US); Jingzhao Ou, Sunnyvale, CA (US)

(73) Assignee: XILINX, Inc., San Jose, CA (US)

( * ) Notice: Subject to any disclaimer, the term of this patent is extended or adjusted under 35 U.S.C. 154(b) by 0 days.

(21) Appl. No.: 12/402,728

(22) Filed: Mar. 12, 2009

(51) Int. Cl.
G01R 31/28 (2006.01)
G06F 7/38 (2006.01)
H03K 19/00 (2006.01)

(52) U.S. Cl. .................. 714/725; 714/731; 326/40; 716/17

(58) Field of Classification Search .......... 714/725, 714/731; 326/40; 716/17
See application file for complete search history.

(56) References Cited

U.S. PATENT DOCUMENTS

| | | | | |
|---|---|---|---|---|
| 5,434,520 | A * | 7/1995 | Yetter et al. | 326/93 |
| 6,247,134 | B1 * | 6/2001 | Sproch et al. | 713/320 |
| 7,065,665 | B2 * | 6/2006 | Jacobson et al. | 713/400 |
| 7,076,682 | B2 * | 7/2006 | Jacobson | 713/600 |
| 7,475,227 | B2 * | 1/2009 | Jacobson et al. | 712/219 |
| 2004/0260960 | A1 * | 12/2004 | Hilgendorf et al. | 713/320 |
| 2007/0067608 | A1 * | 3/2007 | Lofgren et al. | 712/219 |

OTHER PUBLICATIONS

Osborne et al., Reconfigurable design with clock gating, Jul. 21-24, 2008, IEEE, pp. 187-194.*
Mahmoodi et al., Ultra Low-Power Clocking Scheme Using Energy Recovery and Clock Gating, Jan. 2009, IEEE, vol. 17, Issue 1, pp. 33-44.*
Hai et al., DCG: deterministic clock-gating for low-power microprocessor design, Mar. 2004, vol. 12, Issue 3, pp. 245-254.*

* cited by examiner

*Primary Examiner*—John J Tabone, Jr.
(74) *Attorney, Agent, or Firm*—Kevin T. Cuenot; Lois D. Cartier

(57) ABSTRACT

A method of restoring a selected operational state of a circuit design implemented within a programmable integrated circuit (IC) can include pipelining a clock gating signal that selectively pauses a clock of the circuit design, and storing configuration data specifying an operational state of the circuit design at a first simulation clock cycle in non-configuration memory. At a second simulation clock cycle, the clock of the circuit design can be gated. The stored configuration data can be loaded into configuration memory of the programmable IC, wherein loading the configuration data reconfigures the circuit design and restores the operational state of the circuit design in existence at the first simulation clock cycle. The clock of the circuit design can be advanced a number of clock cycles corresponding to a difference between the second simulation clock cycle and the first simulation clock cycle.

20 Claims, 4 Drawing Sheets

RECOVERING A PRIOR STATE OF A CIRCUIT DESIGN WITHIN A PROGRAMMABLE INTEGRATED CIRCUIT

FIELD OF THE INVENTION

The embodiments disclosed herein relate to programmable integrated circuit devices (ICs). More particularly, the embodiments relate to recovering a prior state of a circuit design implemented within a programmable IC when using pipelined clock gating circuitry.

BACKGROUND

Programmable integrated circuit (IC) devices are a well-known type of integrated circuit that can be programmed to perform specified logic functions. One type of programmable IC, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Other types of programmable ICs include complex programmable logic devices (CPLDs), programmable logic arrays (PLAs), and programmable array logic (PAL) devices. For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to, these devices and further can encompass devices that are only partially programmable. For example, one type of programmable IC includes a combination of hard-coded transistor logic and a programmable switch fabric that programmably interconnects the hard-coded transistor logic.

In some situations, it is desirable to be able to stop the clock of a circuit design, or a portion of a circuit design, implemented within a programmable IC. For example, during design and/or testing, a designer may wish to stop the clock of a circuit design and view the values of particular circuit components or signals. In other cases, it is desirable to allow the circuit design to continue operating albeit in a step-wise fashion in which the circuit design is permitted to advance cycle-by-cycle, where the operation of the circuit design is paused for evaluation after each clock cycle.

One technique for achieving such detailed control over the clock of a circuit design is through a technique called clock gating. One type of clock gating circuit involves a dedicated clock buffer that selectively passes a clock signal according to an enable signal applied to the clock buffer. Another type of clock gating circuit utilizes a clock multiplexer that selectively passes the clock signal or a static, unchanging signal, which is the equivalent of passing no clock signal. Depending upon the particular type of clock gating circuit used, the clock buffer, or the clock multiplexer, is coupled to a clock control module. The clock control module implements application specific logic to generate gating signals based upon pre-defined conditions detected within the circuit design being monitored in the programmable IC. The gating signals generated within the clock control module drive the enable signal of the clock buffer or the select signal of the clock multiplexer. De-asserting the enable signal of a clock buffer or selecting a signal with a steady voltage to pass through a clock multiplexer can freeze the clock supplied to downstream circuit designs in the programmable IC. For ease of illustration, the phrase "clock buffer" is used herein to refer to a clock buffer, a clock multiplexer, or any other circuit that may be used within a clock gating circuit to stop or stall a clock signal.

To ensure the proper operation of clock gating, the clock control module must meet setup and hold timing requirements of the clock buffer. When the clock control module is complex or purely combinational, meeting timing requirements may be difficult, if not infeasible, particularly at higher clock rates. In such cases, the clock control module may significantly limit the maximum achievable frequency of the clock, and thus, any circuit designs of the programmable IC utilizing that clock.

One way of ensuring that the timing requirements of the clock buffer are met is to pipeline the clock gating circuit. Pipelining can reduce the critical path delay to the clock buffer. While critical path delays are reduced, latency is incorporated into the clock gating signal, thereby delaying the arrival of the clock gating signal to the clock buffer. Therefore, the clock of the circuit design is not stopped at the exact cycle at which a decision is made to stop the clock. The clock gating signal requires time to propagate through each stage of pipelining to reach the clock buffer before the clock is actually stopped. This latency, while addressing the timing requirements of the clock buffer, is problematic when one wishes to observe the state of a circuit design at the particular clock cycle in which the condition for stopping the clock is detected. By the time the clock control signal reaches the clock buffer, the desired state of the circuit design no longer exists, as the clock has advanced by one or more clock cycles beyond the desired stopping point.

SUMMARY

The embodiments disclosed within this specification relate to recovering a prior state of a circuit design implemented within a programmable integrated circuit (IC) when using pipelined clock gating circuitry. One embodiment of the present invention includes a method of restoring a selected operational state of a circuit design implemented within a programmable IC. The method can include pipelining a clock gating signal that selectively pauses a clock of the circuit design, storing configuration data specifying an operational state of the circuit design at a first simulation clock cycle in non-configuration memory, and, at a second simulation clock cycle, gating the clock of the circuit design. The stored configuration data can be loaded into configuration memory of the programmable IC that controls configuration of the circuit design. Loading the configuration data can reconfigure the circuit design and restore the operational state of the circuit design in existence at the first simulation clock cycle. The clock of the circuit design can be advanced a number of clock cycles corresponding to a difference between the second simulation clock cycle and the first simulation clock cycle, thereby implementing a state of the circuit design in existence at the second simulation clock cycle within the circuit design.

The method can include counting a number of simulation clock cycles occurring after storing the configuration data of the circuit design up to the second simulation clock cycle. The clock of the circuit design can be disabled a predetermined number of clock cycles after gating is initiated due to the pipelining. The method also can include selecting a number of stages of pipelining in the clock gating signal, wherein the predetermined number of clock cycles after gating is initiated corresponds to a number of stages of pipelining introduced into the clock gating signal.

Storing configuration data specifying an operational state of the circuit design can include storing configuration data specifying a state of the circuit design at selected simulation clock cycles throughout operation of the circuit design and retaining, in the non-configuration memory, only the most recent configuration data. In one aspect, storing configuration data specifying the operational state of the circuit design can include storing the configuration data within a memory external to the programmable IC. In another aspect, storing the configuration data specifying the operational state of the circuit design can include storing the configuration data within a memory disposed within the programmable IC.

The method also can include, prior to storing the configuration data of the circuit design, stopping the clock of the circuit design and, responsive to completing the storing of the configuration data, starting the clock of the circuit design.

Another embodiment of the present invention includes a clock control module for use within a programmable IC. The clock control module can include a clock gating circuit generating a pipelined gating signal that disables a clock of a circuit design within the programmable IC, wherein the clock of the circuit design is disabled a predetermined number of clock cycles after the clock cycle in which the gating signal is initiated. The clock control module also can include a snapshot module coupled to the clock control module, the snapshot module storing configuration data specifying an operational state of the circuit design at different clock cycles during operation of the circuit design. The clock control module further can include a correction module coupled to the snapshot module and the clock gating circuit. The correction module, responsive to a state restoration signal, selectively loads a most recent operational state of the circuit design into configuration memory of the programmable IC. The correction module can advance the clock of the circuit design according to a number of simulation clock cycles occurring after a most recent storage of the configuration data until the state restoration signal is received.

The clock control module can further include a counter counting simulation clock cycles starting from a first simulation clock cycle after storing the configuration data specifying the operational state of the circuit design is complete and ending on a second simulation clock cycle when the state restoration signal is received.

The snapshot module can store configuration data by initiating a configuration readback of the configuration memory for the circuit design and storing the configuration data obtained from the configuration readback.

The clock of the circuit design can continue to run for a number of clock cycles after the state restoration signal is received, where the number of clock cycles corresponds to a number of stages of pipelining introduced into the gating signal. Prior to storing the configuration data specifying the operational state of the circuit design, the snapshot module can stall the clock gating circuit to disable the clock of the circuit design. Responsive to completing the storing of configuration data specifying the operational state of the circuit design, the snapshot module can terminate stalling of the clock gating circuit to restart the clock of the circuit design.

Yet another embodiment of the present invention can include a computer program product including a computer-usable medium having computer-usable program code that, when executed by a computer system, causes the computer system to perform the various steps and/or functions disclosed herein or to instantiate a system as described herein within a programmable IC.

DETAILED DESCRIPTION

Figure 1:
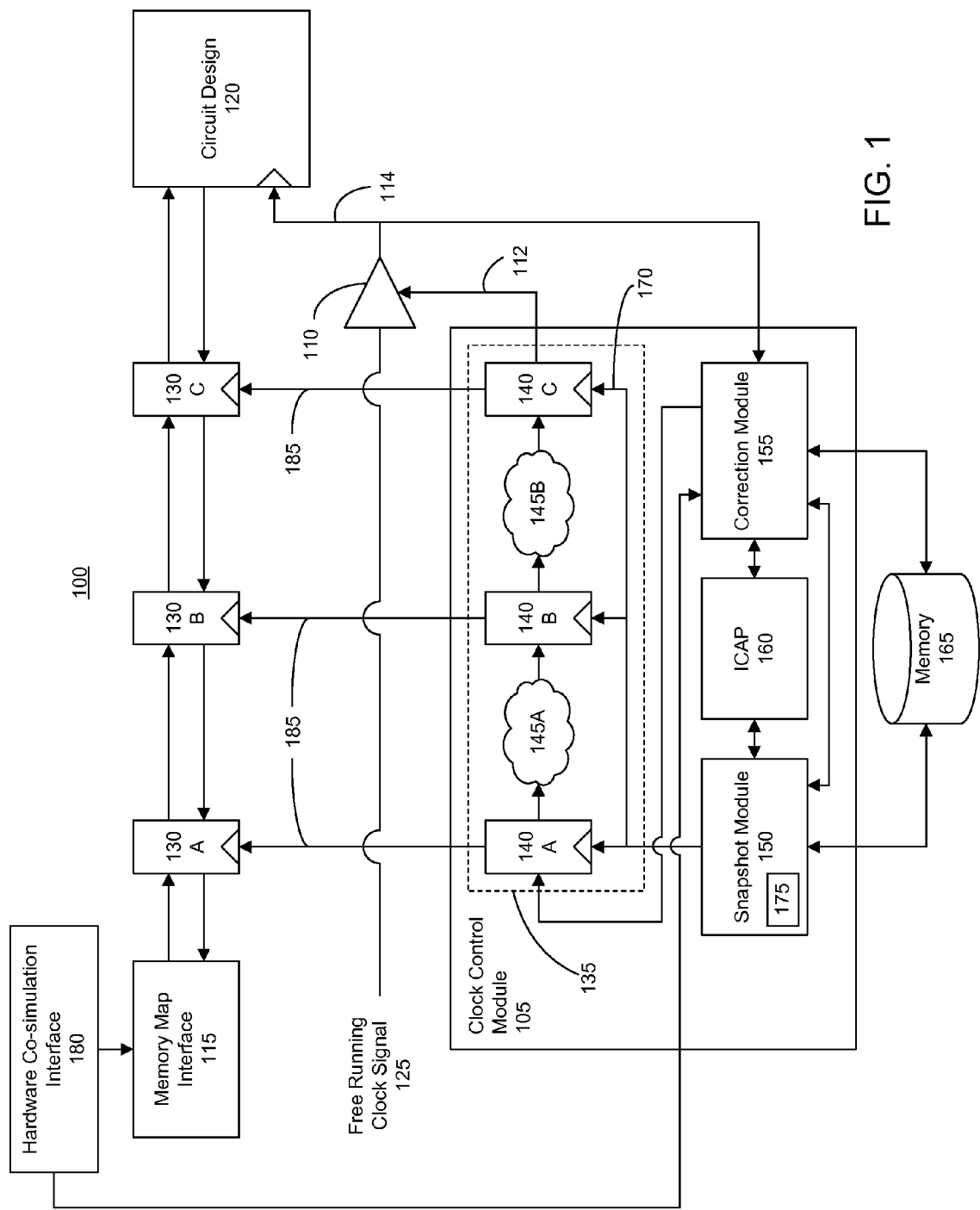
FIG. 1 is a block diagram illustrating a system for recovering a state of a circuit design implemented within a programmable integrated circuit (IC), in accordance with one embodiment of the present invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the invention.

The embodiments disclosed within this specification relate to recovering an operational state of a circuit design implemented within a programmable integrated circuit (IC) device (hereafter "programmable IC"). In accordance with the inventive arrangements disclosed herein, a clock control module, and particularly a clock gating signal of the clock control module, can be pipelined. The clock gating signal is provided to a clock buffer that selectively starts and stops a clock provided to the circuit design. Pipelining the clock gating signal ensures that timing requirements of the clock buffer are met.

Pipelining introduces latency into the clock gating signal, which delays the arrival of the clock gating signal to the clock buffer by one or more clock cycles. This latency means that when the clock gating signal specifies that the clock buffer is to stop the clock, the clock gating signal does not reach the clock buffer until one or more clock cycles after the decision to stop the clock to preserve the operational state of the circuit design has been made. Since the clock of the circuit design continues to operate for those additional clock cycles, so too does the circuit design. The continued operation of the circuit design past the desired stopping point means that the operational state that exists when the clock finally stops is not the operational state that was to be preserved, e.g., is not the operational state that existed when the decision to stop the clock was made.

In accordance with the inventive arrangements disclosed within this specification, the clock control module can include a snapshot module that stores the operational state of the circuit design at various times during operation of the circuit design. Some time after acquisition and storage of an operational state of the circuit design, a state restoration signal can be received. Responsive to the state restoration signal, another module of the clock control circuit, referred to as the correction module, can recall the most recent operational state stored for the circuit design and load that operational state into the relevant portions of configuration memory of the programmable IC. This process effectively implements the most recent operational state of the circuit design in existence some number of clock cycles prior to the receipt of the state restoration signal. The clock of the circuit design then can be advanced in stepwise fashion a number of clock cycles until the circuit design is in the exact operational state that existed at the time the state restoration signal was received, thereby restoring the desired operational state in the circuit design for analysis.

FIG. 1 is a block diagram illustrating a system 100 for recovering a state of a circuit design 120 implemented within a programmable IC, in accordance with one embodiment of the present invention. System 100 represents various blocks or modules, each representing a particular circuit or subsystem, that can be implemented within a programmable IC. As shown, system 100 includes a clock control module 105, a clock buffer 110, a memory map interface 115, a circuit design 120, and other elements as shown in FIG. 1 and described below.

A free running clock signal 125 is provided to circuit design 120 through clock buffer 110. Clock buffer 110 includes an enable port that receives a clock gating signal 112 generated by clock control module 105. When clock control module 105 asserts clock gating signal 112, clock buffer 110 passes free running clock signal 125 through to circuit design 120. In that case, signal 114 is equivalent to free running clock signal 125. Passing free running clock signal 125 effectively starts clock signal 114 to circuit design 120. When clock control module 105 de-asserts clock gating signal 112, clock buffer 110 does not pass free running clock signal 125 through to circuit design 120. In that case, clock signal 114 is not equivalent to free running clock signal 125. Rather, clock signal 114 can be a static, unchanging signal that does not allow circuit design 120 to operate. De-asserting clock gating signal 112 effectively stops clock signal 114 of circuit design 120, and thereby stops the operation of circuit design 120.

It should be appreciated that the use of a clock buffer in FIG. 1 to illustrate exemplary embodiments of the invention is not intended as a limitation. Other circuits for starting and stopping the clock to circuit design 120 may be used, such as a clock multiplexer. In the case of a clock multiplexer, clock gating signal 112 can be provided to the clock multiplexer in the form of a select signal. Clock gating signal 112 can select whether to pass free running clock signal 125 or another signal that does not transition and effectively stops the clock of circuit design 120 when passed. Accordingly, the phrase "clock buffer" has been used within this specification for purposes of illustration only and can refer to an actual clock buffer, a clock multiplexer, or any other sort of circuit that is capable of starting and/or stopping a clock that may operate under the control of a clock gating signal from a clock control module as described herein.

Circuit design 120 can be a circuit, or portion of a circuit, that is implemented within the programmable IC. For example, circuit design 120 can be implemented within programmable IC by loading configuration data, e.g., a bitstream, into configuration memory cells of the programmable IC. As such, circuit design 120 can be functional and operating. Communication with circuit design 120 can be performed via memory map interface 115, for example. Within memory map interface 115, particular addresses of memory can correspond to particular signals or components of circuit design 120. By writing to a particular address of memory map interface 115, the value that is written can be loaded into the signal or component of circuit design 120 that is mapped to the written memory address. Data from circuit design 120 may be output to memory map interface 115 in like manner, so that a peripheral device may read information from particular components or signals of circuit design 120 by reading the data from the corresponding addresses of memory map interface 115. As used herein, "outputting" and/or "output" can mean, for example, writing data to a file, storing or writing data to memory, writing to a user display or other output device, playing audible notifications, sending or transmitting to another system, exporting, or the like.

In one embodiment, the various techniques and circuit modules described within this specification can be utilized in the context of hardware co-simulation. In that case, circuit design 120 can represent a design under test that has been implemented within the programmable IC and is operating in conjunction with a host computer (not shown in FIG. 1) executing a simulation. The host computer can execute a high level modeling system or other simulation program capable of communicating with the programmable IC through a physical communication link, e.g., Ethernet, a point-to-point communication link, or another type of communication bus such as Universal Serial Bus (USB). Through the communication link, the host computer can write data to circuit design 120 by writing to particular addresses within memory map 115 through a hardware co-simulation interface 180. Similarly, the host computer can read data from circuit design 120 by reading data from particular addresses of memory map 115 via hardware co-simulation interface 180.

As shown, data transferred between memory map interface 115 and circuit design 120 can be pipelined. The data may be passed through one or more stages of pipelining, e.g., one or more clocked registers. FIG. 1 illustrates the case where data exchanged between memory map interface 115 and circuit design 120 travels through three stages of pipelining, as represented by clocked registers 130A, 130B, and 130C. Pipelining the data between memory map interface 115 and circuit design 120 mirrors the pipelining to be described with reference to clock control module 105. This mirroring of pipeline stages keeps data synchronized with clock control signals, e.g., clock gating signal 112, exerted by clock control module 105 upon clock buffer 110.

Clock control module 105 can include a clock gating circuit 135, a snapshot module 150, a correction module 155, and an Internal Configuration Access Port (ICAP) 160. Clock gating circuit 135 can provide clock gating signal 112 to clock buffer 110, thereby starting or stopping clock signal 114 to circuit design 120 according to the value of clock gating signal 114. As shown, clock gating circuit 135 is pipelined with clocked registers 140A, 140B, and 140C. Each of registers 140A-140C can correspond to a register in the data path between memory map interface 115 and circuit design 120. That is, a one-to-one correspondence between registers 130A-130C and 140A-140C can be maintained.

Combinatorial logic 145A can be disposed between register 140A and 140B. Similarly, combinatorial logic 145B can be disposed between register 140B and 140C. Registers 140A-140C break the signal path through combinatorial logic 145A and 145B as illustrated, to ensure that the timing requirements of clock buffer 110 are met. Combinatorial logic 145A and 145B can represent logic that detects conditions, e.g., the state restoration signal or other such trigger signals, from circuit design 120 or another source that can cause clock signal 114 to be stopped. Each of registers 130A-130C and registers 140A-140C can be clocked using a common clock signal. In the example pictured in FIG. 1, clocking of registers 130A-130C and registers 140A-140C is controlled through snapshot module 150.

Snapshot module 150 can store the state of circuit design 120 from time-to-time, or periodically, as desired. At selected clock cycles, snapshot module 150 can access ICAP 160. ICAP 160 provides an interface to the configuration memory (not shown) of the programmable IC. Data from selected addresses or cells of the configuration memory that control or configure circuit design 120 may be read using a readback function of ICAP 160. The contents of the selected portion of configuration memory responsible for configuring circuit design 120 specify the operational state of circuit design 120 at the time the configuration data is read. That is, the values stored in the configuration memory cells indicate the values and/or state of each signal and/or component within circuit design 120, and therefore the function implemented by circuit design 120, that is in existence at the clock cycle when the configuration data is read.

In one embodiment, snapshot module 150 initiates readback of the configuration memory through ICAP 160 periodically, e.g., every "N" clock cycles where N is an integer greater than zero. In another embodiment, snapshot module 150 initiates readback through ICAP 160 responsive to a particular circuit condition being detected. The operational state of circuit design 120, as received by snapshot module 150 via ICAP 160, can be stored in memory 165 for later recall. Though the operational state of circuit design 120 may be stored from time-to-time, only the most recent configuration data specifying the operational state need be stored. Earlier stored operational states may be purged from memory when a new operational state is received. Alternatively, newly stored operational states may simply overwrite prior operational states within memory 165.

When storing configuration data for circuit design 120, snapshot module 150 can stall clock gating signal 112 by disabling each of registers 140A-140C and/or each of registers 130A-130C via the clock enable port. That is, snapshot module 150 can de-assert signal 170 provided to the clock enable port of each of registers 140A-140C and de-assert signal 185 provided to the clock enable port of each of registers 130A-130C. This de-assertion effectively stalls the clock gating circuit pipeline without altering the state of the data passing through. By stopping clock signal 114 in this manner, the operational state of circuit design 120 does not change for the entirety of the time period required to perform readback of the programmable IC configuration memory. Only when the storage of the configuration memory for circuit design 120 is complete does the snapshot module 150 restart clock 114, e.g., stop stalling the pipeline by re-asserting signal 170 to the clock enable port of each of registers 140A-140C and re-asserting signal 185 to each of registers 130A-130C.

Snapshot module 150 can include a counter 175. Counter 175 can store a value, e.g., a count, of the number of simulation clock cycles that have passed since the last storage of the operational state of circuit design 120. For example, in the context of hardware co-simulation, when the programmable IC operates in conjunction with a host computer, the operation of the simulation and the programmable IC will be synchronized at certain times. Through the passing of control signals from the host computer to the programmable IC, e.g., via hardware co-simulation interface 180 and/or memory map interface 115, the passage of simulation clock cycles, to be distinguished from hardware clock cycles, can be counted. A simulation clock cycle refers to a simulation of a hardware clock cycle of circuit design 120 that takes place within the host computer. Each simulation clock cycle requires more real time to simulate within the host computer than is required for an actual hardware clock cycle of circuit design 120 to occur. Generally, each simulation clock cycle is synchronized to a hardware clock cycle, although one or both clocks may be paused with respect to the other from time to time during hardware co-simulation. For example, the simulation clock may be stopped or paused while the hardware clock of the circuit design is permitted to continue operating.

In one embodiment, memory 165 is physical memory that is within the programmable IC. In that case, memory 165 can be non-configuration memory, e.g., a block random access memory (BRAM) or other memory block available on the programmable IC that is not configuration memory. Accordingly, the operational state of circuit design 120 can be stored "onboard" the same programmable IC within which circuit design 120 is implemented. In another embodiment, memory 165 is physical memory that exists external to the programmable IC. For example, memory 165 may be disposed within a peripheral device or within a host computing system coupled to the programmable IC through a communication link.

Correction module 155 can control the recall of configuration data, and thus, the operational state of circuit design 120, from memory 165. Responsive to the state restoration signal, correction module 155 can recall the most recently stored configuration data for circuit design 120 from memory 165. In one embodiment, the state restoration signal refers to the stopping of clock signal 114, the receipt of a command, and/or the detection of one or more trigger signals within combinatorial logic 145A and/or 145B. The stopping of clock signal 114 by snapshot module 150, however, is not considered to be a state restoration signal or condition. For example, in one aspect, correction module 155 can monitor clock signal 114. In another aspect, correction module 155 can monitor clock gating signal 112 (connection not shown). Clock signal 114 may be stopped responsive to any of a variety of different conditions including, but not limited to, the detection of a triggering event within circuit design 120, the receipt of a command from another circuit within the programmable IC, or the receipt of a command from another system such as a host computer executing a simulator or HLMS that is issued during hardware co-simulation.

In one embodiment, a state restoration process can be initiated by a clock gating event generated by circuit design 120, e.g., the device under test in the case of hardware co-simulation. In that case, hardware co-simulation interface 180 can monitor for an "interrupt" signal (not shown) generated by circuit design 120. The interrupt signal allows circuit design 120 to stop itself in case of a user-defined error condition or conditional break point. The interrupt signal can be generated by any circuit on the programmable IC or off the programmable IC that is communicatively linked with circuit design 120, including combinatorial logic 145A and/or 145B. When signal 112 stops clock buffer 110, hardware co-simulation interface 180 can determine whether the clock to circuit design 120 was stopped by circuit design 120 itself by virtue of the interrupt signal. If so, hardware co-simulation interface 180 can issue the state restoration signal to correction module 155. Correction module 155 can operate cooperatively with snapshot module 150 to properly disable the pipeline and implement the state restoration process.

Because of the pipelining in clock gating circuit 135, clock gating signal 112 does not arrive at clock buffer 110 at the same clock cycle as when the determination to stop clock signal 114 is made. Clock signal 114 does not actually stop, or become disabled, until several cycles after the occurrence of the condition that initiated the stopping of clock signal 114. Clock signal 114 and circuit design 120 continue to operate for one or more clock cycles beyond the particular clock cycle, or point in time, when the condition that triggered the stopping of clock signal 114 occurred. More particularly, circuit design 120 operates for a number of clock cycles that is equal to the number of pipeline stages in clock gating signal 112. In this example, clock signal 114 continues to run for three clock cycles beyond the intended stopping point.

Responsive to the state restoration signal, correction module 155 can recall the most recent configuration data for circuit design 120 from memory 165. Correction module 155 can write that configuration data to ICAP 160, which causes the configuration data to be written to the appropriate configuration memory cells of the programmable IC, e.g., the particular addresses that program or configure circuit design 120. This process implements the operational state specified by the recalled configuration data in circuit design 120. As will be illustrated with respect to the remaining figures, the recalled operational state is a state that existed some number of clock cycles prior to the initiation of gating signal 112. Thus, the restored operational state is not the operational state that is desired or that was in existence when the state restoration signal was received.

Correction module 155 can cause the clock gating circuit 135 to advance the clock of circuit design 120 by the correct number of clock cycles so that the operational state of circuit design 120 is the operational state that was in existence when the state restoration signal was detected. For example, correction module 155 can feed data into the pipeline to alter clock gating signal 112. In illustration, to advance clock signal 114 in a step-by-step manner, correction module 155 can pass an enable signal into register 140A followed by N−1 disable signals, where N represents the number of stages of pipelining in clock gating circuit 135, e.g., in this case three. For example, introducing an enable signal followed by two disable signals advances the clock by a single cycle. It should be appreciated that a plurality of consecutive enables may be introduced into the pipeline to advance the clock a plurality of clock cycles. In any case, proceeding as described, correction module 155 may advance the clock the correct number of cycles to arrive at the correct, or desired, operational state within circuit design 120.

When the operational state is restored in circuit design 120, snapshot module 150 can effectively reset the pipeline within clock gating circuit 135. In one embodiment, snapshot module 150 can refill the pipeline, e.g., registers 140A-140C, with valid control data and values by stepping such values through the registers 140A-140C. Accordingly, when the operational state is restored, the pipeline is also filled, or refilled, with data that is valid with respect to the restored operational state within circuit design 120. Similarly, though not illustrated in FIG. 1, snapshot module 150 can step valid values into, or through, registers 130A-130C to ensure that the pipeline formed of registers 130A-130C also has valid data with respect to the operational state restored in circuit design 120.

Figure 2:
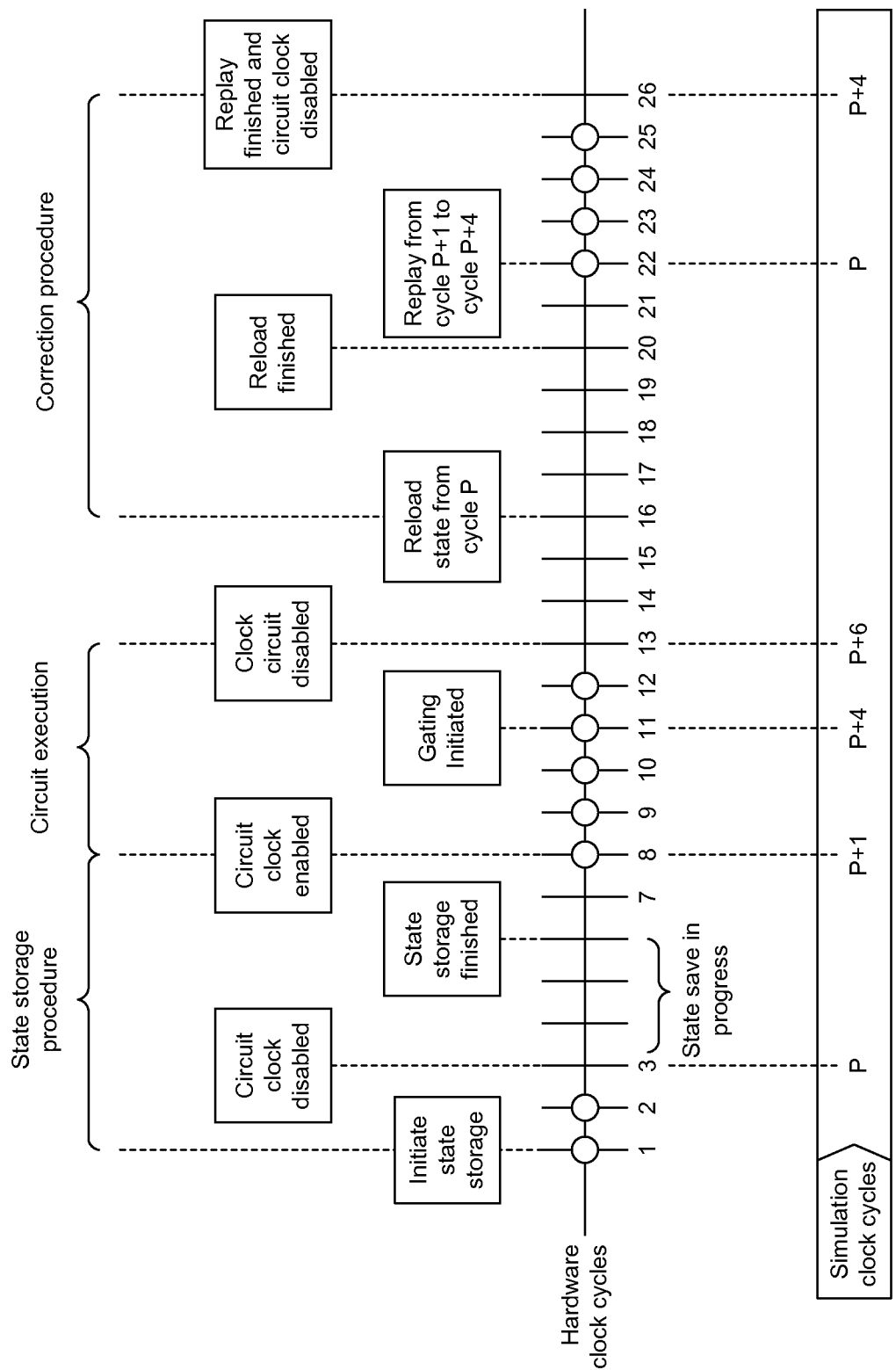
FIG. 2 is a timing diagram illustrating aspects of recovering a state of a circuit design implemented within a programmable IC, in accordance with another embodiment of the present invention.

FIG. 2 is a timing diagram illustrating aspects of recovering a state of a circuit design implemented within a programmable IC, in accordance with another embodiment of the present invention. FIG. 2 illustrates timing and synchronization in the context of hardware co-simulation between a host system and the programmable IC. The horizontal axis of FIG. 2 represents the passage of time with respect to both hardware clock cycles and simulation clock cycles. Each vertical tick on the horizontal axis represents a hardware clock cycle, e.g., a clock cycle of the free running clock signal 125 of FIG. 1. The hardware clock cycles are numbered 1-26 for reference. Clock cycles of the simulation, e.g., a hardware co-simulation where a simulation is executing in conjunction with the circuit design implemented within the programmable IC, are represented in terms of a base simulation time "P." The circles located on the horizontal axis on selected hardware clock cycles, e.g., 1-2, 8-12, and 22-25 indicate those clock cycles in which the clock of the circuit design is enabled, i.e., running.

As shown, at hardware clock cycle (HCC) 1, the clock for the circuit design is running and the snapshot module initiates the storage of the operational state, e.g., configuration data, for the circuit design. While storing the operational state of the circuit design, it is necessary to stop the clock for the circuit design, to prevent the operational state from changing while being captured and stored. Accordingly, when the snapshot module initiates a storage operation to save a set of configuration data for the circuit design, the snapshot module disables the clock of the circuit design.

Depending upon the configuration of the clock control module, the clock of the circuit design may continue to run for one or more cycles before stopping. This amount of "overrun," however is unrelated to the amount of pipelining in the clock gating signal. FIG. 1 is intended to illustrate that the clock may not stop on the exact clock cycle at which the snapshot module initiates the storage operation. At HCC 3, which corresponds to simulation clock cycle P, the clock of the circuit design is disabled, i.e., stopped.

The snapshot module begins storing the operational state of the circuit design at HCC 3 and completes the storage operational state at HCC 6. When storage of the configuration data of the circuit design is finished, the snapshot module allows the clock of the circuit design to continue operating. Accordingly, at HCC 8, which corresponds to simulation clock cycle P+1, the clock of the circuit design is enabled, e.g., operating. This point in time coincides with the end of the state storage procedure.

At HCC 11, a trigger condition occurs that causes the clock control module to initiate clock gating of the circuit design. HCC 11 corresponds to simulation time P+4. Again, due to the pipelining on the gating signal, the clock of the circuit design continues to run at HCC 12 and is disabled at HCC 13, corresponding to simulation clock cycle P+6. Accordingly, the state of the circuit design has run one or more clock cycles beyond the point where the decision was made to observe the operational state, e.g., two clock cycles beyond the occurrence of the trigger condition. That is, gating of the clock was initiated at HCC 11, e.g., simulation clock cycle P+4. The circuit design continued to operate for additional clock cycles, thereby changing the operational state of the circuit design so that the operational state in existence at simulation clock cycle P+4 no longer exists in the circuit design.

Subsequently, at or around HCC 16, the correction module, detecting that the clock signal has been disabled in consequence of a state restoration signal, e.g., by virtue of an interrupt from within the circuit design itself, can begin the correction procedure. The correction module can begin reloading the operational state previously stored by the snapshot module. While the configuration data for the circuit design is loaded, the clock of the circuit design remains disabled. The operational state that is reloaded is the operational state that existed at HCC 3, corresponding to simulation clock cycle P, when the clock for the circuit design was disabled and the operational state of the circuit design was stored. In order to arrive at the desired operational state, e.g., simulation clock cycle P+4, the circuit design, with the restored state from simulation clock cycle P, must be permitted to run for four additional HCCs.

Accordingly, when the reload is finished at HCC 20, the correction module, through control of the clock gating signal and injection of enable and/or disable signals into the data path of the pipeline registers of the clock control circuit, pulses the clock of the circuit design four times, so that the simulation clock cycle advances from simulation clock cycle P to simulation clock cycle P+4. Simulation clock cycle P+4 coincides with HCC 26. At HCC 26, the replay is complete and the clock of the circuit design is disabled. It should be appreciated that the clock gating signal can advance the clock cycle-by-cycle. Accordingly, at HCC 26, the operational state of the circuit design is the same as the operational state that existed when the decision was made to gate the clock of the circuit design, e.g., the same as the operational state that existed at HCC 11 corresponding to simulation clock cycle P+4.

The control paths of the memory map interface, e.g., read enable signals and write enable signals, can be reset or loaded with valid data by the hardware co-simulation interface, e.g., under control of the simulation system executing within the host computer. The register interface of the memory map, for example, referring to the pipeline registers 130A-130C of FIG. 1, can be reloaded with desired state data during the state restoration process by the clock control module.

Figure 3:
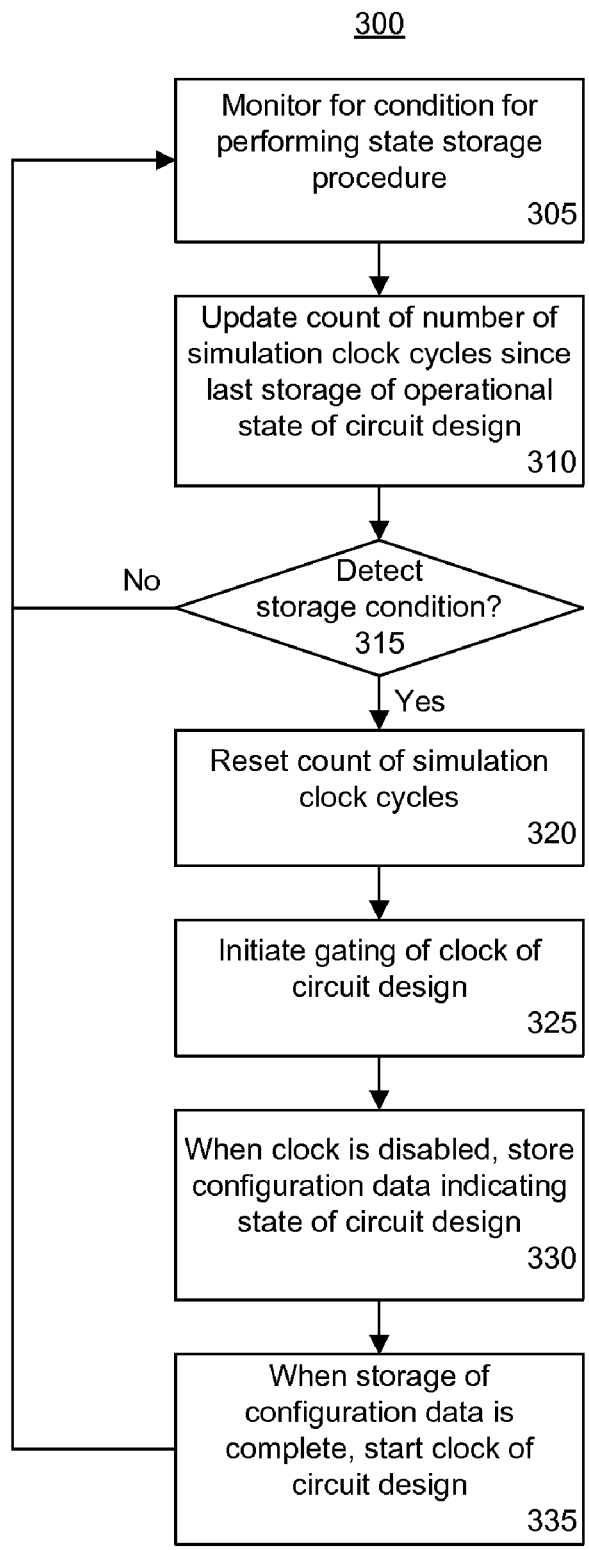
FIG. 3 is a first flow chart illustrating a method of implementing a state storage procedure for a circuit design implemented within a programmable IC, in accordance with another embodiment of the present invention.

FIG. 3 is a first flow chart illustrating a method 300 of implementing a state storage procedure for a circuit design implemented within a programmable IC, in accordance with another embodiment of the present invention. Method 300 can be implemented using a clock control module as described with reference to FIGS. 1 and 2, for example, to capture the operational state of a circuit design that has been implemented within a programmable IC.

Beginning in step 305, the snapshot module of the clock control module can monitor for a state storage condition, the occurrence of which will cause the snapshot module to store the operational state of the circuit design. Examples of state storage conditions can include, but are not limited to, the occurrence of a trigger condition within the circuit design, the passage of a predetermined number of hardware clock cycles, the passage of a predetermined number of simulation clock cycles, the receipt of a command by the snapshot module from a host computing system that is coupled to the programmable IC, or the receipt of some other control signal provided to the snapshot module from another device or circuit design.

In step 310, a count of the number of simulation clock cycles that have passed since the last simulation clock cycle when the operational state of the circuit design was stored can be maintained. The count can be updated, e.g., incremented, for each passing simulation clock cycle. In step 315, the snapshot module can determine whether a condition that causes the storage of the operational state of the circuit design has been detected. If so, method 300 can proceed to step 320. If not, method 300 can loop back to step 305 to continue processing.

In step 320, as the process for storing a new operational state of the circuit design is initiated, the count of the simulation clock cycles can be reset. In step 325, gating of the clock of the circuit design can be initiated. As noted, the clock may continue to run for one or more additional clock cycles prior to being disabled, e.g., stopping. The operational state of the circuit design is not stored until the clock is stopped, to prevent any changes to the state of the circuit design during the storage operation.

In step 330, when the clock of the circuit design is disabled, the configuration data for the circuit design that reflects the operational state of the circuit design can be stored. As noted, the snapshot module can initiate a readback function via the ICAP to read configuration data from the relevant configuration memory cells responsible for instantiating the circuit design within the programmable IC. The operational state may be stored within non-configuration memory of the programmable IC or within an external data storage device, e.g., a host computer or other peripheral with memory.

Continuing with step 335, when storage of the configuration data is complete, the clock of the circuit design can be started. The method can loop back to step 305 to continue operating and storing the operational state of the circuit design. As noted, only the most recent operational state of the circuit design need be stored. Prior stored operational states may be deleted or overwritten.

Figure 4:
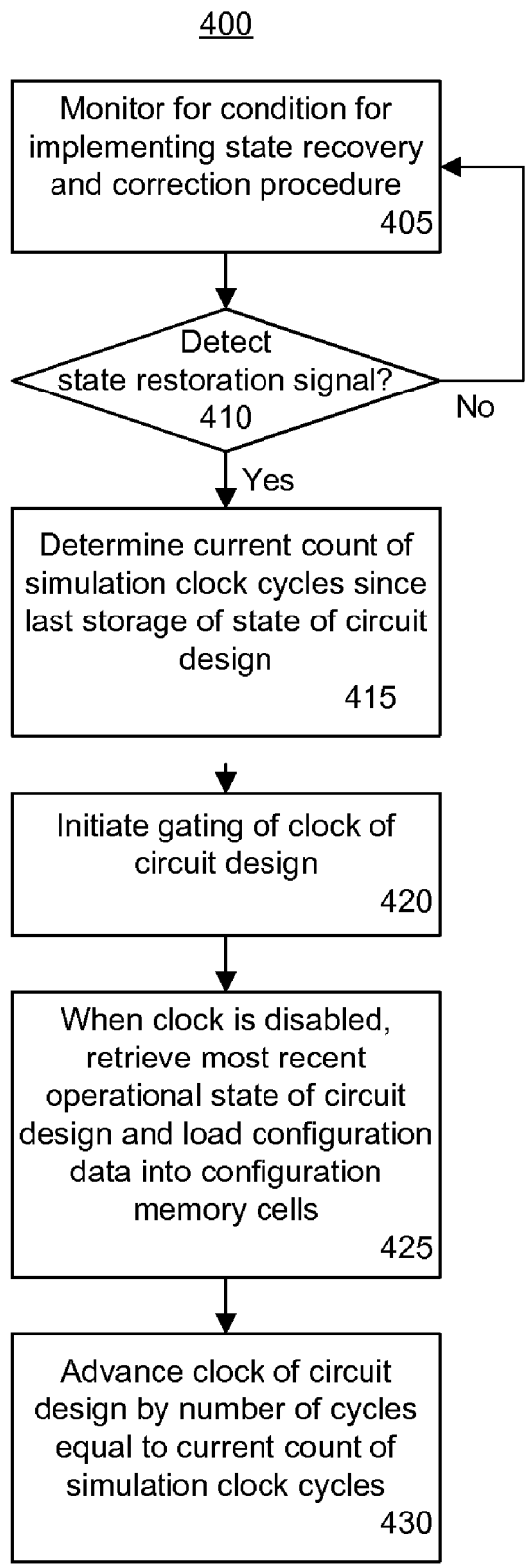
FIG. 4 is a second flow chart illustrating a method of implementing a state recovery and correction procedure to restore a selected operating state of a circuit design implemented within the programmable IC in accordance with another embodiment of the present invention.

FIG. 4 is a second flow chart illustrating a method 400 of implementing a state recovery and correction procedure to restore a selected operating state of a circuit design implemented within the programmable IC, in accordance with another embodiment of the present invention. Method 400 can be implemented using a clock control module as described with reference to FIGS. 1-3, for example, to restore, or recover, a selected operational state of the circuit design within the programmable IC.

Method 400 can begin in step 405, where the correction module of the clock control module can monitor for the occurrence of a state restoration signal. As noted, the state restoration signal can cause the correction module to implement a correction procedure that restores a particular operational state within the circuit design. Though the trigger condition, e.g., the interrupt signal, has been described as one that occurs within the circuit design itself, it should be appreciated that a control signal can be provided to the correction module from any of a variety of sources, whether on the programmable IC or off, that can invoke the correction procedure described.

In step 410, the correction module can determine whether the state restoration signal causing initiation of the correction procedure has been detected. If so, method 400 can proceed to step 415. If not, method 400 can loop back to step 405. Continuing with step 415, the correction module can determine the current count of simulation clock cycles that have elapsed since the last operational state of the circuit design was stored. In step 420, the correction module can initiate gating of the clock of the circuit design. The clock of the circuit design must be stopped in order to restore the operational state of the circuit design, e.g., to write configuration data to the configuration memory cells that regulate the implementation of the circuit design within the programmable IC.

In step 425, when the clock is disabled, the correction module can retrieve the most recently stored operational state of the circuit design and load that configuration data into the configuration memory cells for the circuit design. This process restores the circuit design to the exact state in existence when the configuration data was stored. In step 430, after the operational state has been loaded, thereby restoring the state of the circuit design at the simulation time when the operational state was stored, the clock of the circuit design can be advanced a selected number of clock cycles. The number of clock cycles that the clock is advanced can coincide with the current count of simulation clock cycles that have elapsed since the operational state of the circuit design just loaded into the configuration memory was stored.

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

It should be appreciated that embodiments of the present invention can be embedded in a computer program product, which comprises all the features enabling the implementation of the methods and systems described herein. The computer program product can include a computer-usable or computer-readable medium having computer-usable program code which, when loaded within, and executed by, a computer system, causes the computer system to perform the functions described herein or instantiate a system as described herein within a programmable IC. Examples of computer-usable or computer-readable media can include, but are not limited to, optical media, magnetic media, magneto-optical media, computer memory such as random access memory or hard disk(s), or the like.

For example, one embodiment of the present invention can include a computer program product having stored thereon computer-usable program code specifying an intellectual property (IP) core. An IP core, or "core," refers to a predesigned, programmatic description of hardware that performs a particular function. The IP core can be specified as a hardware description language file or files, as a bitstream that programs a programmable IC, whether fully or partially programmable, as a netlist, or the like. Alternatively, an IP core can include source code or schematics that describe the logic and connectivity of a portion of a circuit design. Some IP cores include an optimally floorplanned layout targeted to a specific family of ICs. IP cores can also be parameterizable in that the user may enter parameters to activate or change certain functionality of the IP core.

A "computer," e.g., a data processing system or a computer system, suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices such as, for example, keyboards, displays, pointing devices, etc., can be coupled to the computer either directly or through intervening I/O controllers. Network adapters may also be coupled to the computer to enable the computer to become coupled to other computers, devices, or remote printers or storage devices through intervening private or public networks. Modems, cable modems, and Ethernet cards are just a few of the currently available types of network adapters.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library, an IP core, and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A method of restoring a selected operational state of a circuit design implemented within a programmable integrated circuit (IC), the method comprising:

pipelining a clock gating signal that selectively pauses a clock of the circuit design;

storing configuration data specifying an operational state of the circuit design at a first simulation clock cycle in non-configuration memory;

at a second simulation clock cycle, gating the clock of the circuit design;

loading the stored configuration data into configuration memory of the programmable IC that controls configuration of the circuit design, wherein loading the configuration data reconfigures the circuit design and restores the operational state of the circuit design in existence at the first simulation clock cycle; and advancing the clock of the circuit design a number of clock cycles corresponding to a difference between the second simulation clock cycle and the first simulation clock cycle, wherein a state of the circuit design in existence at the second simulation clock cycle is implemented within the circuit design.

2. The method of claim 1, further comprising counting a number of simulation clock cycles occurring after storing the configuration data of the circuit design up to the second simulation clock cycle.

3. The method of claim 1, wherein the clock of the circuit design is disabled a predetermined number of clock cycles after gating is initiated due to the pipelining.

4. The method of claim 3, further comprising selecting a number of stages of pipelining in the clock gating signal, wherein the predetermined number of clock cycles after gating is initiated corresponds to a number of stages of pipelining introduced into the clock gating signal.

5. The method of claim 1, wherein storing configuration data specifying an operational state of the circuit design further comprises:
   storing configuration data specifying a state of the circuit design at selected simulation clock cycles throughout operation of the circuit design; and
   retaining, in the non-configuration memory, only the most recent configuration data.

6. The method of claim 1, further comprising:
   prior to storing the configuration data of the circuit design, stopping the clock of the circuit design; and
   responsive to completing the storing of the configuration data, starting the clock of the circuit design.

7. The method of claim 1, wherein storing configuration data specifying the operational state of the circuit design comprises storing the configuration data within a memory external to the programmable IC.

8. The method of claim 1, wherein storing the configuration data specifying the operational state of the circuit design comprises storing the configuration data within a memory disposed within the programmable IC.

9. A clock control module for use within a programmable integrated circuit (IC), the clock control module comprising:
   a clock gating circuit generating a pipelined gating signal that disables a clock of a circuit design within the programmable IC, wherein the clock of the circuit design is disabled a predetermined number of clock cycles after the clock cycle in which the gating signal is initiated;
   a snapshot module coupled to the clock gating circuit, the snapshot module storing configuration data specifying an operational state of the circuit design at different clock cycles during operation of the circuit design; and
   a correction module coupled to the snapshot module and the clock gating circuit, wherein the correction module, responsive to a state restoration signal, selectively loads a most recent operational state of the circuit design into configuration memory of the programmable IC, and wherein the correction module advances the clock of the circuit design according to a number of simulation clock cycles occurring after a most recent storage of the configuration data until the state restoration signal is received.

10. The clock control module of claim 9, further comprising a counter counting simulation clock cycles starting from a first simulation clock cycle after storing the configuration data specifying the operational state of the circuit design is complete and ending on a second simulation clock cycle when the state restoration signal is received.

11. The clock control module of claim 9, wherein the snapshot module stores the configuration data by initiating a configuration readback of the configuration memory for the circuit design and storing the configuration data obtained from the configuration readback.

12. The clock control module of claim 9, wherein the clock of the circuit design continues to run for a number of clock cycles after the state restoration signal is received, and wherein the number of clock cycles corresponds to a number of stages of pipelining introduced into the pipelined gating signal.

13. The clock control module of claim 9, wherein prior to storing the configuration data specifying the operational state of the circuit design, the snapshot module stalls the clock gating circuit to disable the clock of the circuit design.

14. The clock control module of claim 13, wherein responsive to completing the storage of the configuration data specifying the operational state of the circuit design, the snapshot module terminates stalling of the clock gating circuit to restart the clock of the circuit design.

15. A computer program product, comprising:
   a computer-usable medium comprising computer-usable program code that, when executed by a computer, implements a clock control module for use within a programmable integrated circuit (IC), the computer-usable medium comprising:
   computer-usable program code that implements a clock gating circuit generating a pipelined gating signal that disables a clock of a circuit design within the programmable IC, wherein the clock of the circuit design is disabled a predetermined number of clock cycles after the clock cycle in which the gating signal is initiated;
   computer-usable program code that implements a snapshot module storing configuration data specifying an operational state of the circuit design at different clock cycles during operation of the circuit design; and
   computer-usable program code that implements a correction module that, responsive to a state restoration signal, selectively loads a most recent operational state of the circuit design into configuration memory of the programmable IC, wherein the correction module advances the clock of the circuit design according to a number of simulation clock cycles occurring after a most recent storage of the configuration data until the state restoration signal is received.

16. The computer program product of claim 15, wherein the computer-usable medium further comprises computer-usable program code that implements a counter counting simulation clock cycles starting from a first simulation clock cycle after storing the configuration data specifying the operational state of the circuit design is complete and ending on a second simulation clock cycle when the state restoration signal is received.

17. The computer program product of claim 15, wherein the snapshot module stores configuration data by initiating a configuration readback of the configuration memory for the circuit design and stores the configuration data obtained from the configuration readback.

18. The computer program product of claim 15, wherein the clock of the circuit design continues to run for a number of clock cycles after the state restoration signal is received, and wherein the number of clock cycles corresponds to a number of stages of pipelining introduced into the pipelined gating signal.

19. The computer program product of claim 15, wherein prior to storing the configuration data specifying the operational state of the circuit design, the snapshot module stalls the clock gating circuit to disable the clock of the circuit design.

20. The computer program product of claim 19, wherein responsive to completing the storage of the configuration data specifying the operational state of the circuit design, the snapshot module terminates stalling of the clock gating circuit to restart the clock of the circuit design.

* * * * *